(12) United States Patent
Yanagi (10) Patent No.: US 8,824,654 B2
(45) Date of Patent: Sep. 2, 2014

(54) COMMUNICATION DEVICE

(75) Inventor: Satoru Yanagi, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 354 days.

(21) Appl. No.: 13/070,632

(22) Filed: Mar. 24, 2011

(65) Prior Publication Data

US 2011/0310890 A1 Dec. 22, 2011

(30) Foreign Application Priority Data

Jun. 17, 2010 (JP) ................................ 2010-138647

(51) Int. Cl.
*H04Q 1/00* (2006.01)
*H04N 1/00* (2006.01)
*H04L 29/06* (2006.01)
*H04N 1/333* (2006.01)

(52) U.S. Cl.
CPC ........ *H04N 1/00214* (2013.01); *H04L 65/1006* (2013.01); *H04N 1/33392* (2013.01); *H04N 2201/002* (2013.01); *H04N 2201/0027* (2013.01); *H04N 2201/0036* (2013.01); *H04L 65/1069* (2013.01); *H04N 2201/33342* (2013.01); *H04N 1/00212* (2013.01); *H04N 1/0022* (2013.01); *H04N 1/33323* (2013.01); *H04N 1/00217* (2013.01); *H04N 2201/0022* (2013.01); *H04N 2201/0039* (2013.01); *H04N 1/00244* (2013.01); *H04N 1/33376* (2013.01)
USPC .......... 379/219; 379/220.1; 370/352

(58) Field of Classification Search
None
See application file for complete search history.

(56) References Cited

U.S. PATENT DOCUMENTS 6,426,942 B1 7/2002 Sienel et al.
6,978,296 B2 12/2005 Maeda et al.
(Continued)

FOREIGN PATENT DOCUMENTS

GB 2 431 317 A 4/2007
JP 11-225206 A 8/1999
(Continued)

OTHER PUBLICATIONS

Mulberry, et al., "Fon Draft Document; TD13, Rev. 2 (WP 1/2)", Drafts; Study Period 2009-2012, International Telecommunication Union, Geneva; CH vol. Study Group 2, $23^{rd}$ Nov. 2009, pp. 1-28.
(Continued)

*Primary Examiner* — Asad Nawaz
*Assistant Examiner* — Jason Harley
(74) *Attorney, Agent, or Firm* — Scully, Scott, Murphy & Presser, PC (57) ABSTRACT

A communication device configured to be connected with both a public switched telephone network and an IP network. The communication device may comprise an input allowing unit configured to allow a user to input specific identification information for the public switched telephone network, a judging unit configured to judge whether or not the communication device itself is in a specific state that is capable of executing a first communication process of communicating via the IP network using IP identification information for the IP network, and a communication unit configured to execute the first communication process, in a first case where the communication device is judged as being in the specific state, and execute a second communication process of communicating via the public switched telephone network, in a second case where the communication device is judged as not being in the specific state.

5 Claims, 4 Drawing Sheets

(56) References Cited

U.S. PATENT DOCUMENTS

| | | | |
|---|---|---|---|
| 2003/0002637 A1* | 1/2003 | Miyauchi et al. | 379/93.01 |
| 2003/0202462 A1 | 10/2003 | Smith et al. | |
| 2004/0146048 A1* | 7/2004 | Cotte | 370/352 |
| 2005/0018657 A1 | 1/2005 | Nakao et al. | |
| 2005/0025043 A1 | 2/2005 | Mussman et al. | |
| 2006/0039290 A1* | 2/2006 | Roden et al. | 370/241 |
| 2006/0106930 A1* | 5/2006 | Shaffer | 709/224 |
| 2006/0288089 A1 | 12/2006 | Goldstein | |
| 2007/0064677 A1 | 3/2007 | Xiong | |
| 2007/0297391 A1* | 12/2007 | Furukawa et al. | 370/352 |
| 2009/0003535 A1 | 1/2009 | Grabelsky et al. | |
| 2009/0172138 A1* | 7/2009 | Wang et al. | 709/223 |
| 2009/0180457 A1 | 7/2009 | Shiga et al. | |
| 2009/0310600 A1* | 12/2009 | Kung et al. | 370/352 |
| 2010/0241861 A1 | 9/2010 | Yoshimoto | |

FOREIGN PATENT DOCUMENTS

| | | |
|---|---|---|
| JP | 2004-241870 | 8/2004 |
| JP | 2005-150916 A | 6/2005 |
| JP | 2005-184552 A | 7/2005 |
| JP | 2005-303369 | 10/2005 |
| JP | 2007-274497 A | 10/2007 |
| JP | 2008-219502 A | 9/2008 |
| WO | WO 03/038643 A1 | 5/2003 |
| WO | WO 2009/072271 A1 | 6/2009 |

OTHER PUBLICATIONS

Extended European Search Report dated Jun. 16, 2011 from Application No. 11157731.8-2202.

Chinese Office Action dated Jul. 1, 2013, from related Chinese Application No. 201110083689.5, together with an English language translation.

Chinese Office Action dated Mar. 21, 2014, from related Chinese Application No. 201110083689.5, together with an English language translation.

Notification of Reason for Rejection dated Feb. 25, 2014 from related Japanese Application No. 2010-138647, together with an English language translation.

* cited by examiner

COMMUNICATION DEVICE

CROSS-REFERENCE TO RELATED APPLICATIONS

This application claims priority to Japanese Patent Application No. 2010-138647, filed on Jun. 17, 2010, the contents of which are hereby incorporated by reference into the present application.

TECHNICAL FIELD

Techniques disclosed in the present application are related to a communication device configured to be connected with both a public switched telephone network and an IP (Internet Protocol) network.

DESCRIPTION OF RELATED ART

It is known a facsimile device configured to be connected with both a telephone network and an IP network. When a user inputs a facsimile number indicating a destination of facsimile data to the facsimile device, the facsimile device acquires an IP address for an IP network using the facsimile number and sends the facsimile data via the IP network to the acquired IP address as the destination. In addition, when the IP address for the IP network cannot be acquired using the facsimile number input by the user, the facsimile device sends the facsimile data via the telephone network to the facsimile number as the destination.

SUMMARY

The technique described above is based on the premise that the facsimile device itself is in a state where both a process of sending the facsimile data via the telephone network and a process of sending the facsimile data via the IP network can be executed. However, for example, if the user of the facsimile device does not have a contract with a provider that enables the facsimile device to communicate via the IP network, the facsimile device itself cannot execute the both processes. The technique described above gives no consideration whatsoever to a state where the facsimile device itself cannot execute both of the processes described above.

The present specification discloses techniques that enable a communication device to execute an appropriate communication process depending on a state of the communication device itself (in the example, described above, the facsimile device itself).

One aspect of techniques disclosed in the present specification is a communication device. The communication device configured to be connected with both a public switched telephone network and an IP network. The communication device may comprise an input allowing unit, a judging unit, and a communication unit. The input allowing unit configured to allow a user to input specific identification information for the public switched telephone network. The judging unit configured to judge whether or not the communication device itself is in a specific state that is capable of executing a first communication process of communicating via the IP network using IP identification information for the IP network, the IP identification information including the specific identification information input by the user. The communication unit configured to execute the first communication process using specific IP identification information that includes the specific identification information, in a first case where the communication device itself is judged as being in the specific state and the specific identification information is input by the user. The communication unit configured to execute a second communication process of communicating via the public switched telephone network using the specific identification information, in a second case where the communication device itself is judged as not being in the specific state and the specific identification information is input by the user.

Moreover, a control method, a computer program, and a non-transitory computer-readable storage medium for storing the computer program for the communication device described above are also novel and useful. Furthermore, a system comprising the communication device described above and a terminal device is also novel and useful.

DETAILED DESCRIPTION OF THE PREFERRED EMBODIMENT

A. Embodiment

A-1. System Configuration

Figure 1:
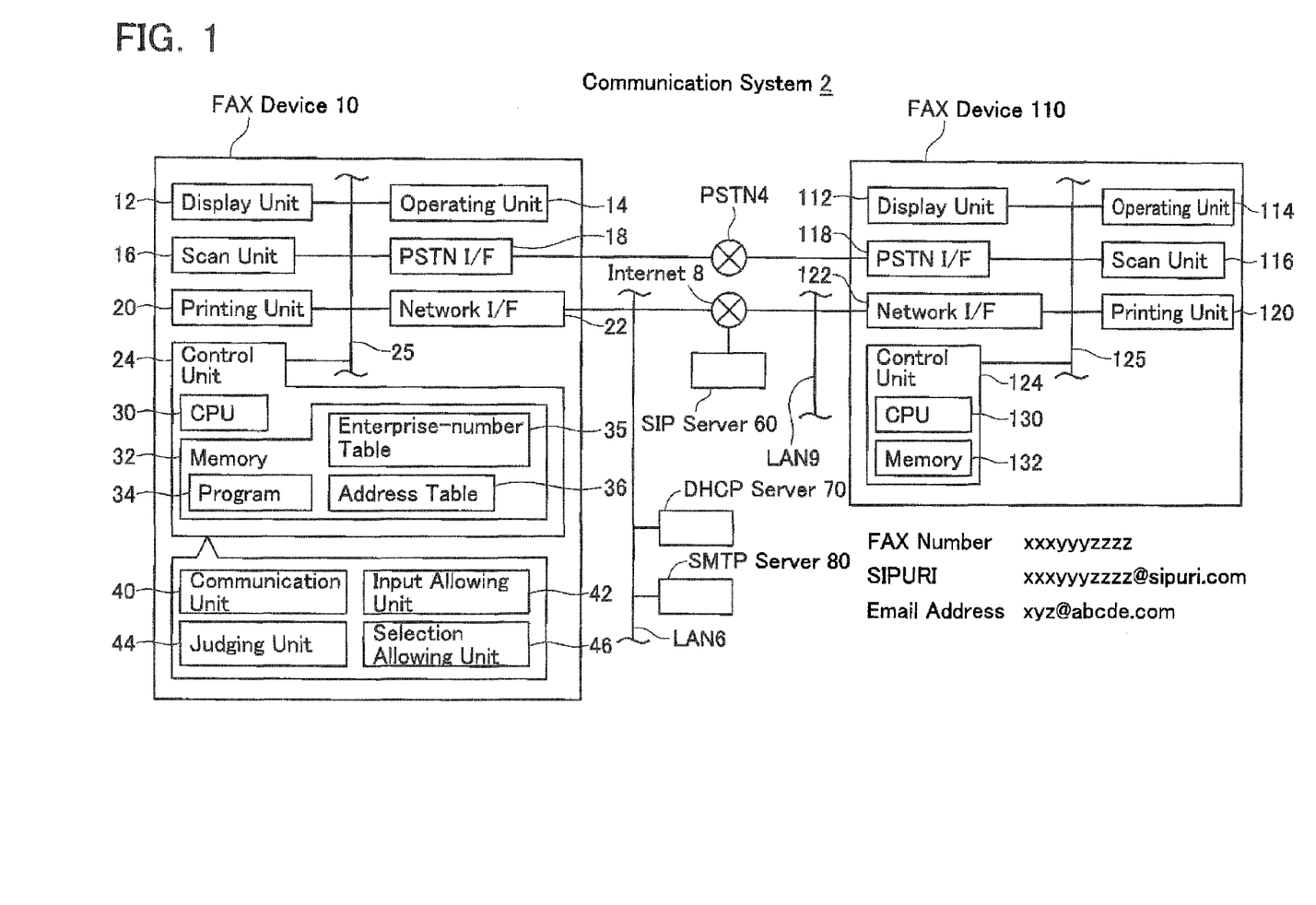
FIG. 1 shows an example of a configuration of a communication system.

An embodiment will be described with reference to the drawings. As shown in FIG. 1, a communication system 2 comprises a PSTN (Public Switched Telephone Network) 4, the Internet 8, LANs 6 and 9, FAX devices 10 and 110, an SIP (Session Initiation Protocol) server 60, a DHCP (Dynamic Host Configuration Protocol) server 70, and an SMTP (Simple Mail Transfer Protocol) server 80. The FAX devices 10 and 110 are connected to the PSTN 4. The FAX devices 10 and 110 are capable of communicating with each other via the PSTN 4. The FAX device 10, the DHCP server 70, and the SMTP server 80 are connected to the LAN 6. The respective devices 10, 70, and 80 are capable of communicating with each other via the LAN 6. The FAX device 110 is connected to the LAN 9. The LAN 6, the LAN 9, and the SIP server 60 are connected to the Internet 8. The FAX device 10, the FAX device 110 and the SIP server 60 are capable of communicating with each other via the LANs 6 and 9 and the Internet 8.

A-2. Configuration of FAX Device 10

A configuration of the FAX device 10 will be described. The FAX device 10 is equipped with various functions such as a PSTN FAX function, an IP FAX function, an WAX function, a copier function, a printer function, and a scanner function. The PSTN FAX function is a function for communicating (in other words, sending and receiving) FAX data via the PSTN 4 using a PSTN FAX number that is identification information of each FAX device (a so-called FAX number) for executing communication via the PSTN 4. The IP FAX function is a function for communicating FAX data via the Internet 8 using an SIPURI. The IFAX function is a function for communicating an e-mail message with attached FAX data via the Internet 8 using an e-mail address.

The FAX device 10 comprises a display unit 12, an operating unit 14, a scan unit 16, a PSTN interface 18, a printing unit 20, a network interface 22, and a control unit 24. The respective units 12 to 24 are connected to a bus line 25. The display unit 12 is a display for displaying various kinds of information. The operating unit 114 comprises a plurality of keys. By operating the operating unit 14, a user can input various instructions into the FAX device 10. The scan unit 16 comprises a scanning mechanism such as a CIS and a CCD, and generates image data by scanning a scan object. The PSTN interface 18 is connected to the PSTN 4. The printing unit 20 comprises a printing mechanism such as an ink-jet head printing mechanism and a laser printing mechanism, and performs printing according to an instruction from the control unit 24. The network interface 22 is connected to the LAN 6.

The control unit 24 comprises a CPU 30 and a memory 32. The memory 32 stores a program 34, an enterprise-number table 35, and an address table 36. The CPU 30 executes processes according to the program 34 stored in the memory 32. Functions of the respective units 40 to 46 are realized due to the CPU 30 executing processes according to the program 34. The enterprise-number table 35 contains at least one enterprise-number that indicates at least one provider (hereinafter, referred to as a "first-type provider") capable of providing the FAX device 10 with the state where the IP FAX function using the SIPURI including the PSTN FAX number is executable. An enterprise-number is an enterprise code number unique to each provider. The enterprise-number table 35 is stored in advance in the memory 32. For example, the enterprise-number table 35 may be stored in advance in the memory 32 by a vendor or a manufacturer of the FAX device 10. In addition, for example, the FAX device 10 may acquire the enterprise-number table 35 from a predetermined server (e.g., a server provided by the vendor or the manufacturer of the FAX device 10) and store the enterprise-number table 35 in the memory 32 in advance. By operating the operating unit 14, the user can add other enterprise-numbers to the enterprise-number table 35. The address table 36 contains pluralities of PSTN FAX numbers, SIPURIs, e-mail addresses, telephone numbers, and the like input by the user.

A-3. Configuration of SIP Server 60

A configuration of the SIP server 60 will be described. For each of the FAX devices 10 and 110, the SIP server 60 stores the IP address of the FAX device and the SIPURI of the FAX device in association with each other. The SIP server 60 is connected to the Internet 8. Using the SIP, the SIP server 60 controls the communication between the FAX device 10 and the FAX device 110. In other words, for example, various commands that are communicated in order to execute an IP FAX sending process between the FAX device 10 and the FAX device 110 are sent via the SIP server 60.

A-4. Configuration of DHCP Server 70

A configuration of the DHCP server 70 will be described. The DHCP server 70 is connected to the LAN 6. The DHCP server 70 assigns an IP address to each device (such as the FAX device 10) connected to the LAN 6. In addition, the DHCP server 70 stores DHCP information. The DHCP information includes an option 120 (IP address of the SIP server 60) and an option 125 (provider information indicating a provider) to be described later.

A-5. Configuration of SMTP Server 80

A configuration of the SMTP server 80 will be described. The SMTP server 80 is connected to the LAN 6. The SMTP server 80 receives the e-mail message sent from each device (such as the FAX device 10) connected to the LAN 6, and sends the e-mail message to an SMTP server (not shown) for a device (such as the FAX device 110) that is a destination of the e-mail message.

A-6. Configuration of FAX Device 110

The FAX device 110 is equipped with respective functions similar to those of the FAX device 10. The FAX device 110 comprises a display unit 112, an operating unit 114, a scan unit 116, a PSTN interface 118, a printing unit 120, a network interface 122, and a control unit 124. The respective units 112 to 124 are connected to a bus line 125. Configurations of the respective units 112 to 124 are similar to the configurations of the respective units 12 to 24 of the FAX device 10. The control unit 124 comprises a CPU 130 and a memory 132 in a similar manner to the control unit 24. In the present embodiment, a PSTN FAX number "xxxyyyzzzz", an SIPURI "xxxyyyzzzz@sipuri.com", and an e-mail address "xyz@abcde.com" are assigned to the FAX device 110 (refer to FIG. 1). The SIPURI of the FAX device 110 includes the PSTN FAX number "xxxyyyzzzz" of the FAX device 110. More specifically, the SIPURI of the FAX device 110 has a domain "sipuri.com" of the SIP server 60 added to the PSTN FAX number "xxxyyyzzzz" of the FAX device 110. The FAX number, the SIPURI, and the e-mail address of the FAX device 110 are all registered in the address table 36 of the FAX device 10.

A-7. Preparation by User

Before describing the respective processes executed by the control unit 24 of the FAX device 10, preparation to be performed by the user of the FAX device 10 will be described. First, the user can place the FAX device 10 in the state where the IP FAX function is executable by entering a contract with any provider. In this case, an SIPURI is assigned to the FAX device 10. The user can enter a contract with either a first-type provider or a second-type provider. As described earlier, the first-type provider is a provider capable of providing the FAX device 10 with the state where the IP FAX function using the SIPURI including the PSTN FAX number is executable. The second-type provider is a provider capable of providing the FAX device 10 with the state where the IP FAX function using the SIPURI unrelated to the PSTN FAX number is executable. Hereinafter, the provider contracted by the user will be referred to as the "contracted provider". If the user enters a contract with the first-type provider, the SIPURI of the FAX device 10 includes the PSTN FAX number of the FAX device 10. If, on the other hand, the user enters a contract with the second-type provider, the SIPURI of the FAX device 10 does not include the PSTN FAX number of the FAX device 10. In other words, the SIPURI (e.g., abc . . . ) of the FAX device 10 and the PSTN FAX number (e.g., 0123456 . . . ) of the FAX device 10 are pieces of identification information that are completely unrelated to each other. In the present example, it is assumed that the user of the FAX device 110 has entered a contract with the first-type provider. Therefore, as shown in FIG. 1, the SIPURI of the FAX device 110, "xxxyyyzzzz@sipuri.com", includes the PSTN FAX number "xxxyyyzzzz" of the FAX device 110.

A-8. Processes Executed by FAX Device 10

Next, respective processes executed by the control unit 24 of the FAX device 10 will be described with reference to FIGS. 2 to 4.

(A-8-1. Boot Process)

A boot process that is executed upon booting of the FAX device 10 will be described with reference to FIG. 2. The boot process is a process for judging whether or not the FAX device 10 itself is in a specific state. The specific state is a state where the FAX device 10 itself is capable of executing both the PSTN FAX sending process in which FAX data is sent via the PSTN 4 using the PSTN FAX number for PSTN that is input by the user and the IP FAX sending process in which FAX data is sent via the Internet 8 using the SIPURI including the PSTN FAX number. The specific state in this embodiment may be restated as a state where the user has entered a contract with the first-type provider.

When power of the FAX device 10 is turned on, a judging unit 44 (refer to FIG. 1) broadcasts a search command for searching the DHCP server 70 connected to the LAN 6 (52). The search command is received by the respective devices (refer to reference numerals 70 and 80 in FIG. 1) connected to the LAN 6. Upon receiving the search command, the DHCP server 70 connected to the LAN 6 sends a response packet including an IP address of the DHCP server 70 itself to the FAX device 10. On the other hand, a device (the SMTP server 80) other than the DHCP server 70 connected to the LAN 6 does not send a response packet When the search command is broadcast, the judging unit 44 judges whether or not the DHCP server 70 connected to the LAN 6 has been found (S4). The judging unit 44 makes a judgment of YES in S4 when the response packet is received within a predetermined period of time after the broadcast of the search command. If YES in S4, the judging unit 44 proceeds to S6. On the other hand, if NO in S4, the judging unit 44 proceeds to S20.

In S6, the judging unit 44 sends a request command that requests transmission of DHCP information to the DHCP server 70. The judging unit 44 sends the request command to, as a destination, the IP address of the DHCP server 70 included in the response packet received from the DHCP server 70. The request command is a command for requesting an option 120 and an option 125. Moreover, the option 120 includes the IP address of the SIP server 60 provided by the contracted provider, and the option 125 includes provider information indicating the contracted provider. The provider information included in the option 125 includes an enterprise-number of the contracted provider. Upon receiving the request command, the DHCP server 70 sends DHCP information including various pieces of information corresponding to the request command to the FAX device 10. The judging unit 44 receives the DHCP information sent by the DHCP server 70 (S8).

Next, the judging unit 44 judges whether or not the received DHCP information includes the option 120 (S10). For example, when the IP address of the SIP server 60 provided by the contracted provider is registered in advance in the DHCP server 70 by the contracted provider, the DHCP information includes the option 120 indicating the IP address of the SIP server 60. In this case, a judgment of YES is made in S10. On the other hand, for example, when the IP address of the SIP server 60 provided by the contracted provider has not been registered in advance in the DHCP server 70 by the contracted provider (e.g., when the user has not entered a contract with the provider), the DHCP information does not include the option 120. In this case, a judgment of NO is made in S10. In addition, the DHCP server 70 is equipped with a function for assigning an IP address to each device connected to the LAN 6. There may be cases where the DHCP server 70 is connected to the LAN 6 solely for assigning IP addresses. In this case, the DHCP server 70 similarly does not store values of the option 120 and the option 125. In this case, a judgment of NO is similarly made in S10 or in subsequent S12.

If YES in S10, the judging unit 44 judges whether or not the received DHCP information includes the option 125 (S12). For example, when the enterprise-number of the contracted provider is registered in advance in the DHCP server 70 by the contracted provider, the DHCP information includes the option 125 indicating the enterprise-number of the contracted provider. In this case, a judgment of YES is made in S12. On the other hand, when the enterprise-number of the contracted provider has not been registered in advance in the DHCP server 70 by the contracted provider (e.g., when the user has not entered a contract with the provider), the DHCP information does not include the option 125. In this case, the judgment of NO is made in S12. Moreover, there may be cases where FAX transmission/reception using an IP network is performed without involving the contracted provider as is a case where the SIP server 60 is connected to the LAN 6. In this case, the DHCP server 70 stores a value of the option 120 but not a value of the option 125. In this case, the judgment of NO is similarly made in S12.

If YES in S12, the judging unit 44 determines whether or not the enterprise-number included in the option 125 is identical with any of the enterprise-numbers included in the enterprise-number table 35 (refer to FIG. 1) (S14). If the contracted provider is the first-type provider, the enterprise-number included in the option 125 is identical with one of the enterprise-numbers included in the enterprise-number table 35 (refer to FIG. 1). In this case, the judging unit 44 makes a judgment of YES in S14. On the other hand, if the contracted provider is a second-type provider, the enterprise-number included in the option 125 is not identical with any of the enterprise-numbers included in the enterprise-number table 35 (refer to FIG. 1). In this case, the judging unit 44 makes a judgment of NO in S14. The judgment of YES in S14 means that the FAX device 10 has been judged to be in the specific state. In this case, the judging unit 44 stores a value indicated by the option 120 as the IP address of the SIP server 60 in the memory 32 (S16). Furthermore, the judging unit 44 stores judgment result information indicating that the FAX device 10 is in the specific state in the memory 32 (S18). The boot process ends upon conclusion of S18.

In the present embodiment, as described above, the judging unit 44 determines whether or not the enterprise-number included in the option 125 is identical with any of the enterprise-numbers included in the enterprise-number table 35 (refer to FIG. 1), and if so, makes a judgment of YES in S14. Therefore, a judgment on whether or not the FAX device 10 itself is in the specific state can be made in an appropriate manner.

Moreover, the judgment of NO made in any of S4, S10, S12, and S14 means that the judgment which indicates that the FAX device 10 is not in the specific state has been made. In this case, the judging unit 44 stores judgment result information indicating that the FAX device 10 is not in the specific state in the memory 32 (S20). The boot process ends upon conclusion of S20.

(A-8-2. Mode selecting process)

Next, a mode selecting process (not shown) will he described. The mode selecting process is a process for having the user select an operating mode of the FAX device 10. By operating the operating unit 14, the user can input a mode selection instruction into the FAX device 10. When the mode selection instruction is input, a selection allowing unit 46 (refer to FIG. 1) causes the display unit 12 to display a predetermined mode selection screen (not shown). The user operates the operating unit 14 while viewing the mode selection screen to select a desired operating mode from three operating modes, namely, "FAX", "IP FAX", and "WAX". The selection allowing unit 46 stores operating mode information indicating the operating mode selected by the user in the memory 32. After storing the operating mode information in the memory 32, the selection allowing unit 46 ends the mode selecting process. Moreover, default operating mode information indicating "FAX" is stored in the memory 32 upon shipment of the FAX device 10 according to the present embodiment. Therefore, after the shipment of the FAX device 10, the operating mode of the FAX device 10 is set to "FAX" if the mode selecting process is not executed.

(A-8-3. FAX Sending Process)

Next, a FAX sending process will be described with reference to FIGS. 3 and 4. Hereinafter, contents of the FAX sending process will be described using, as an example, a case where the FAX device 10 sends FAX data to the FAX device 110.

As a prerequisite for this process to be performed, the IP address of the SIP server 60, the SIP domain name (sipuri.com (refer to FIG. 1)) of the SIP server 60, and the IP address of the SMTP server 80 must be stored in the memory 32. When it is judged in the boot process that the FAX device 10 is in the specific state (YES in S14), the IP address of the SIP server 60 has been stored in the memory 32 (S16). However, when it is judged in the boot process that the FAX device 10 is not in the specific state (NO in any of S4, S10, S12, and S 14), the IP address of the SIP server 60 is not stored in the memory 32. In addition, even if it is assumed that a judgment that the FAX device 10 is in the specific state has been made in the boot process, the SIP domain name of the SIP server 60 and the IP address of the SMTP server 80 are not stored in, the memory 32 at the end of the boot process.

Generally, the IP address of the SIP server 60, the SIP domain name of the SIP server 60, and the IP address of the SMTP server 80 are provided to the user by the contracted provider when (or after) entering a contract with the contracted provider. For example, the IP address of the SIP server 60 and the like may be provided by the contracted provider to the user by handing over a medium (e.g., paper) notifying the IP address of the SIP server 60 and the like. In addition, the IP address of the SIP server 60 and the like may be provided by the contracted provider to the user by releasing the IP address of the SIP server 60 and the like on a website of the contracted provider or the like and having the user view the website. Therefore, for example, after the FAX device 10 is booted, the IP address of the SIP server 60, the SIP domain name of the SIP server 60, and the IP address of the SMTP server 80 acquired by the user can be stored in the memory 32 before executing the FAX sending process by operating the operating unit 14 and performing a predetermined storing operation.

After the FAX device 10 is booted, an input allowing unit 42 (refer to FIG. 1) monitors input of the FAX sending operation (S30). In a state where a document is set on an automatic document feeder (not shown) by the user, the user can operate the operating unit 14 to designate identification information (any one of a FAX number "xxxyyyzzzz", an SIPURI "xxxyyyzzzz@sipuri.com", and an e-mail address "xyz@abcde.com" shown in FIG. 1) of the FAX device 110 that is the destination. The identification information of the FAX device 110 can be designated by sequentially designating a plurality of symbols (numerals, alphabetical letters, and the like) or by designating the identification information stored in the address table 36. Next, the user can input a predetermined FAX sending operation by operating the operating unit 14. The input allowing unit 42 makes a judgment of YES in S30 when the FAX sending operation is input.

If YES in S30, a communication unit 40 (refer to FIG. 1) acquires FAX data (S32). Specifically, the communication unit 40 causes the scan unit 16 to scan the document set in the automatic document feeder. Accordingly, the scan unit 16 generates scan data. By acquiring the scan data from the scan unit 16, the communication unit 40 acquires the FAX data. Next, the communication unit 40 acquires the identification information of the destination designated by the user (S34). For example, when "FAX" has been selected by the user as the operating mode of the FAX device 10, the user generally designates the PSTN FAX number (in other words, a digit sequence) as the destination assuming that the PSTN FAX sending process is to be executed. In this case, in S34, the communication unit 40 acquires the PSTN FAX number (in the present embodiment, the PSTN FAX number "xxxyyyzzzz" of the FAX device 110). In addition, for example, when "IP FAX" has been selected by the user as the operating mode of the FAX device 10, the user generally designates the SIPURI as the destination assuming that the IP FAX sending process is to be executed. In this case, in S34, the communication unit 40 acquires the SIPURI (in the present embodiment, the SIPURI "xxxyyyzzzz@sipuri.com" of the FAX device 110). Furthermore, for example, when "IFAX" has been selected by the user as the operating mode of the FAX device 10, the user generally designates the e-mail address as the destination assuming that the IFAX sending process is to be executed. In this case, in S34, the communication unit 40 acquires the e-mail address (in the present embodiment, the e-mail address "xyz@abcde.com" of the FAX device 110).

Next, the communication unit 40 judges whether or not the operating mode of the FAX device 10 is "FAX" (S36). Specifically, the communication unit 40 reads out the operating mode information stored in the memory 32 and judges whether or not the operating mode indicated by the read operating mode information is "FAX". When the operating mode is "FAX", the communication unit 40 makes a judgment of YES in S36. In this case, the identification information of the FAX device 110 that is the destination acquired in S34 is the PSTN FAX number "xxxyyyzzzz" (refer to FIG. 1). The communication unit 40 judges whether or not the FAX device 10 is in the specific state (S38). Specifically, the communication unit 40 reads out the judgment result information stored in the memory 32 and judges whether or not the read judgment result information is information indicating that the FAX device 10 is in the specific state. When the judgment result information is the information indicating that the FAX device 10 is in the specific state, the communication unit 40 makes a judgment of YES in S38.

Figure 2:
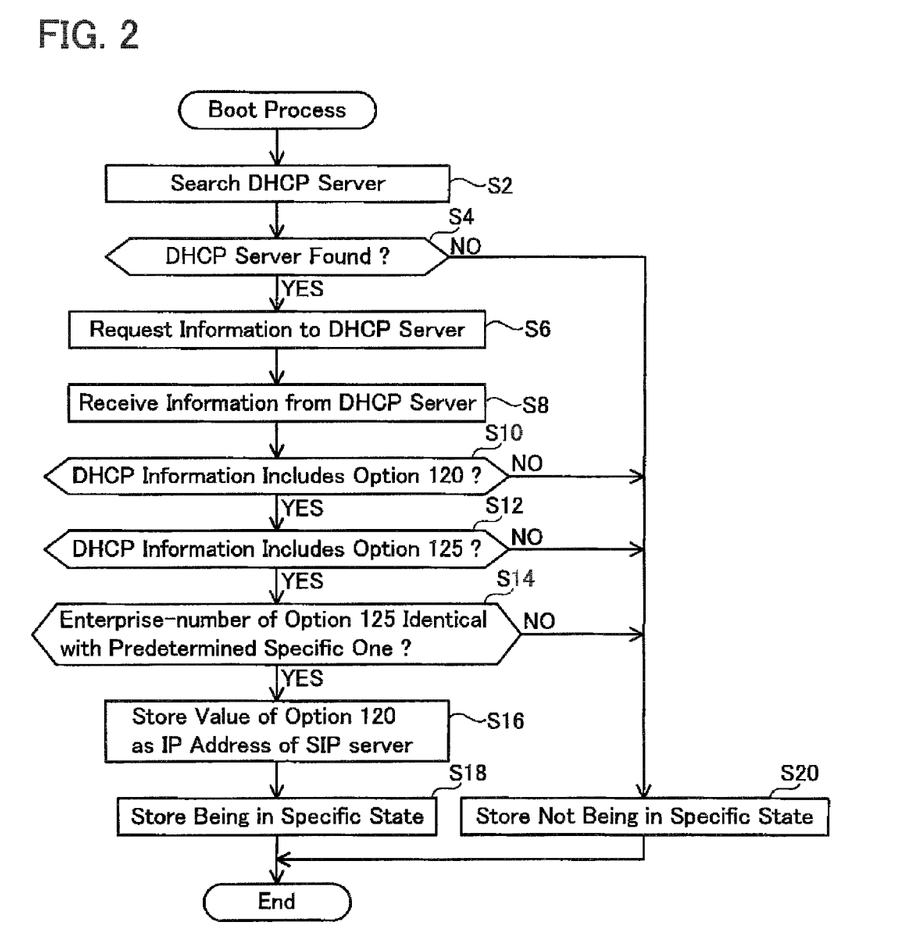
FIG. 2 shows a flow chart of a boot process.

In the present embodiment, the judgment on whether or not the FAX device 10 is in the specific state has already been made by the judging unit 44 in the boot process (refer to FIG. 2). Therefore, in the FAX sending process, the judging unit 44 need not execute the judgment once again (in other words, processes of S2 to S14 in FIG. 2 need not be executed), and when the PSTN FAX number is input by the user (S34), the communication unit 40 need only confirm the result of the judgment made in the hoot process (S38). Since a processing load of the judgment described above is greater than that of a process of confirming judgment result information stored in the memory 32, only a small processing load is applied on the FAX device 10 during the FAX sending process.

If YES in S38, the communication unit 40 reads out the IP address of the SIP server 60 and the SIP domain name of the SIP server 60 from the memory 32 (S40). Since the FAX device 10 is in the specific state (the contracted provider is the first-type provider), in S40, the communication unit 40 reads out the IP address stored in the memory 32 in S16 in FIG. 2. Furthermore, the communication unit 40 reads out the SIP domain name of the SIP server 60 stored in the memory 32 by the predetermined storing operation. Next, the communication unit 40 generates the SIPURI "xxxyyrzzzz@sipuri.com" (refer to FIG. 1) of the FAX device 110 that is the destination from the SIP domain name (sipuri.com) read out in S40 and the identification information (the FAX number "xxx-yyyzzzz") acquired in S34 (S42).

Next, the communication unit 40 sends an INVITE to the SIP server 60 using the SIPIJRI generated in S42 as the destination (S44). The SIP server 60 transfers the INVITE to the FAX device 110. Upon receiving the INVITE, the FAX device 110 sends a 200OK to the SIP server 60. The SIP server 60 transfers the 200OK to the FAX device 10.

After sending the INVITE, the communication unit 40 monitors whether or not a 200OK is received (S46). The communication unit 40 makes a judgment of YES upon receiving the 200OK transferred by the SIP server 60. If YES in S46, the communication unit 40 sends an ACK to the SIP server 60 using the SIPURI as the destination (S48). The SIP server 60 transfers the ACK to the FAX device 110. The FAX device 110 receives the ACK. Accordingly, a communication session is established between the FAX device 10 and the FAX device 110 (S50). Next, the communication unit 40 sends the FAX data acquired in S32 to the FAX device 110 via the Internet 8 without having the SIP server 60 transfer the FAX data (S52). Upon conclusion of transmission of the FAX data, the communication unit 40 ends the FAX sending process.

Figure 3:
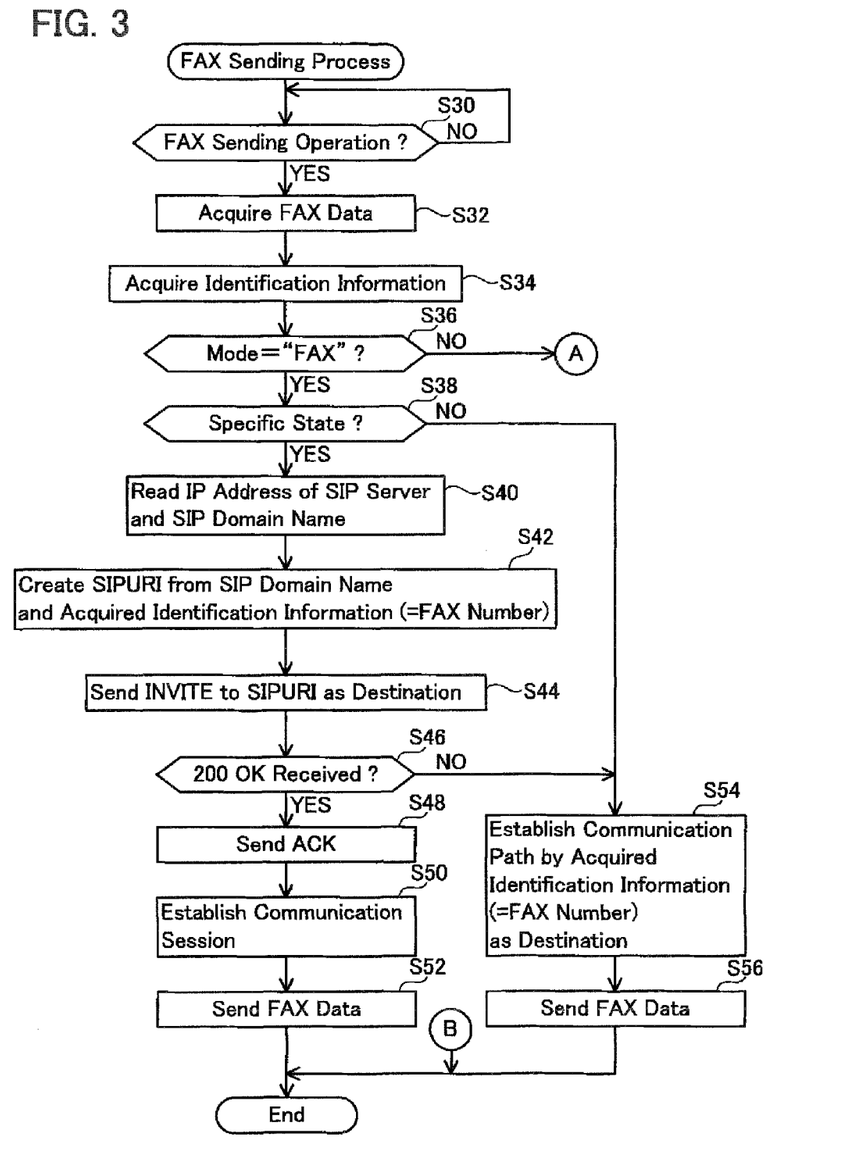
FIG. 3 shows a flow chart of a FAX sending process.

In the present embodiment, as described above, even in a case where the user has selected the FAX mode, when the FAX device 10 is in the specific state (YES in S38), the communication unit 40 generates the SIPURI using the FAX number acquired in S34 in FIG. 3 (S42), and executes the IP FAX sending process (S44 to S52). The IP FAX sending process is generally advantageous with respect to fees, communication speed, and the like in comparison to the PSTN FAX sending process. Therefore, preferentially executing the IP FAX sending process offers significant advantages to the user.

On the other hand, for example, if the contracted provider is the second-type provider, since the FAX device 10 is not in the specific state, the communication unit 40 makes a judgment of NO in S38. In addition, for example, even if the contracted provider is the first-type provider (in other words, when the FAX device 10 is in the specific state (YES in S38)), when the contracted provider that the user of the FAX device 10 has contracted differs from the contracted provider that had been contracted by the user of the FAX device 110 that is the destination, the domain name of the SIP server for the FAX device 110 that is the destination may differ from the domain name of the SIP server 60. In this case, even if an SIPURI that is a combination of the PSTN FAX number of the FAX device 110 and the domain name of the SIP server 60 is generated in S42, it is possible that the SIPURI may not be identical with the SIPURI of the FAX device 110. Therefore, in such a state, the FAX device 110 is unable to receive the INVITE and, as a result, is unable to send the 200OK. Consequently, the communication unit 40 makes a judgment of NO in S46. In addition, when a case is assumed where another FAX device that differs from the FAX device 110 is designated by the user as the destination FAX device and the other FAX device is not equipped with the IP FAX function, the other FAX device is unable to receive the INVITE and, as a result, is unable to send the 200OK. In this case also, the communication unit 40 makes the judgment of NO in S46.

When NO in S38 or when NO in S46, the communication unit 40 performs a transmission via the PSTN 4 to the PSTN FAX number "xxxyyyzzzz" acquired in S34 as the destination and establishes a communication path (S54). When the communication path is established between the FAX device 10 and the FAX device 110, the communication unit 40 sends the FAX data acquired in S32 to the FAX device 110 via the PSTN 4 (S56). Upon conclusion of the transmission of the FAX data, the communication unit 40 ends the FAX sending process.

As described above, in the present embodiment, in S46, when the communication unit 40 is unable to receive the 200OK within the predetermined period of time (NO in S46) or, in other words, when the IP FAX sending process using the SIPURI generated in S42 fails, the PSTN FAX sending process using the FAX number acquired in S34 is executed (S54 and S56). Therefore, even when the IP FAX sending process fails, the FAX device 10 is capable of appropriately executing the FAX transmission that is desired by the user. In addition, since the PSTN FAX sending process is executed using the FAX number already acquired in S34 without requiring the user to perform a new operation, the user need not input the FAX number once again. Therefore, a workload on the user can also be reduced.

Figure 4:
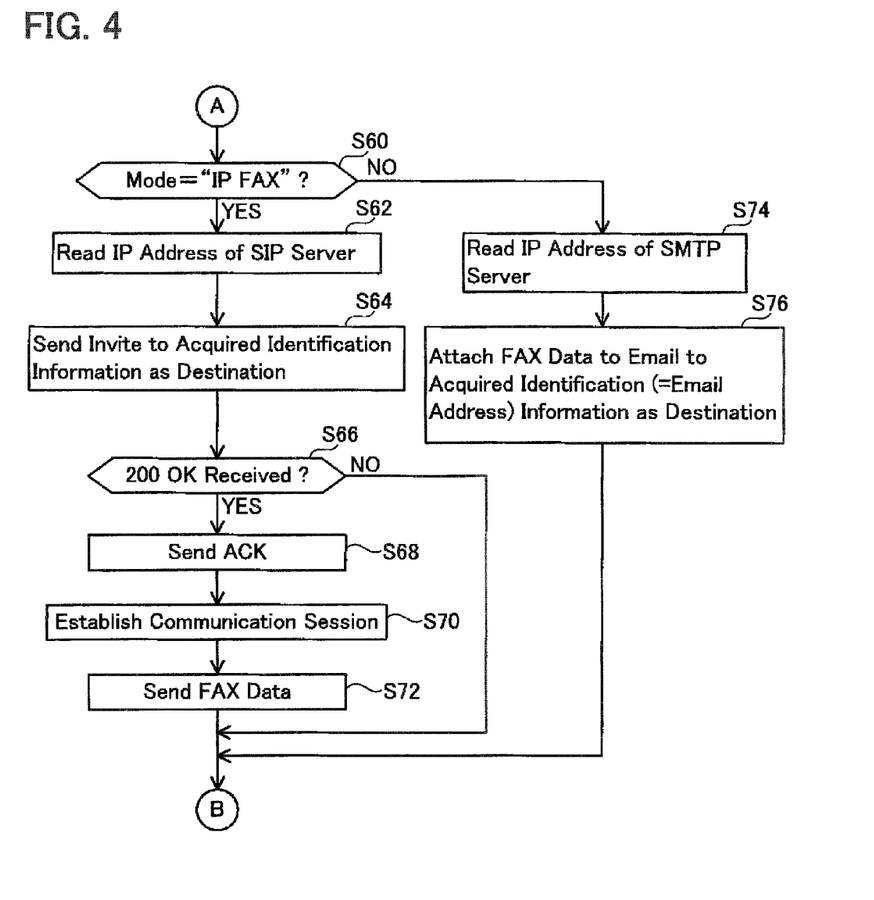
FIG. 4 shows a continuation of the flow chart shown in FIG. 3.

When the operating mode read out in S36 is "IP FAX", the communication unit 40 makes the judgment of NO in S36 and makes a judgment of YES in S60 in FIG. 4. In this case, the identification information of the FAX device 110 that is the destination acquired in 534 in FIG. 3 is the SIPURI "xxxyyyzzzz@sipuri.com" (refer to FIG. 1). The communication unit 40 reads out the IP address of the SIP server from the memory 32 (S62). In S62, when the contracted provider is the first-type provider (when the FAX device 10 is in the specific state), the communication unit 40 reads out the IP address stored in the memory 32 in S16 in FIG. 2. On the other hand, when the contracted provider is the second-type provider (when the FAX device 10 is not in the specific state), the communication unit 40 reads out the IP address stored in the memory 32 by the predetermined storing operation. Moreover, the identification information of the FAX device 110 that is the destination acquired in S34 in FIG. 3 is the SIPURI "xxxyyyzzzz@sipuri.com" and includes an SIP domain name. Therefore, in S62, the communication unit 40 does not read out the SIP domain name from the memory 32. Next, the communication unit 40 sends the INVITE to the SIP server 60 using the identification information acquired in S34 in FIG. 3 or, in other words, the SIPURI as the destination (S64). The SIP server 60 transfers the INVITE to the FAX device 110. Upon receiving the INVITE, the FAX device 110 sends the 200OK to the SIP server 60. The SIP server 60 transfers the 200OK to the FAX device 10.

After sending the INVITE, the communication unit 40 monitors whether or not a 200OK is received (S66). The communication unit 40 makes a judgment of YES upon receiving the 200OK transferred by the SIP server 60. If YES in S66, the communication unit 40 sends an ACK to the SIP server 60 using the SIPURI as a destination (S68). The SIP server 60 transfers the ACK to the FAX device 110. The FAX device 110 receives the ACK. Accordingly, a communication session is established between the FAX device 10 and the FAX device 110 (S70). Next, the communication unit 40 sends the FAX data acquired in S32 in FIG. 3 to the FAX device 110 without having the SIP server 60 transfer the FAX data (S72 in FIG. 4). Upon conclusion of transmission of the FAX data, the communication unit 40 ends the FAX sending process. On the other hand, when the communication unit 40 is unable to receive a 200OK within a predetermined period of time after sending the INVITE in S64, the communication unit 40 makes a judgment of NO in S66. In this case, the communication unit 40 performs a predetermined error display on the display unit 12 and ends the FAX sending process.

When the operating mode read out in S36 in FIG. 3 is "IFAX", the communication unit 40 makes a judgment of NO in both S36 and S60 in FIG. 4. In this case, the identification information of the FAX device 110 that is the destination acquired in S34 in FIG. 3 is an e-mail address "xyz@abcde.com" (refer to FIG. D. The communication unit 40 reads out the IP address of the SMTP server 80 stored in the memory 32 by the predetermined storing operation (S74 in FIG. 4). Next, the communication unit 40 creates an e-mail message to which the FAX data acquired in S32 in FIG. 3 is attached. The communication unit 40 sends the created e-mail message to the SMTP server 80 using the identification information acquired in S34 or, in other words, the e-mail address as the destination (S76). The SMTP server 80 identifies an SMTP server (not shown) for the FAX device 110 connected to the LAN 9 from the e-mail address that is the destination of the e-mail message and sends the e-mail message to the identified SMTP server. The SMTP server for the FAX device 110 transfers the e-mail message to a mailbox in a POP (Post Office Protocol) server (not shown), and the e-mail message is stored in the mailbox. A control unit 124 of the FAX device 110 downloads the e-mail message from the POP server. As a result of the process, the FAX device 110 acquires the FAX data attached to the e-mail message. After sending the e-mail message to the SMTP server 80 in S76, the communication unit ends the FAX sending process.

The communication system 2 according to the present embodiment has been heretofore described. As shown in S10 to S20 in FIG. 2, in the boot process, the judging unit 44 (refer to FIG. 1) judges whether or not the FAX device 10 itself is in the specific state. In addition, as shown in FIG. 3, in the FAX sending process, when a FAX number has been input by the user (YES in S36) and the FAX device 10 is in the specific state (YES in S38), the communication unit 40 generates an SIPURI including the input FAX number (S42) and executes the IP FAX sending process to the generated SIPURI as the destination (S44 to S52). Normally, the IP FAX sending process provides the user with more advantages (e.g., an advantage in the communication fees or an advantage in the communication speed) than the PSTN FAX sending process. When the FAX device 10 is in the specific state, the IP FAX sending process that is more advantageous to the user is preferentially executed. In addition, according to the present embodiment, when the FAX device 10 is in the specific state, the user can execute the IP FAX sending process by merely inputting a FAX number that is a character string including only numerals. The IP FAX sending process can be executed without having the user input the SIPURI, which can be a troublesome input operation for the user. An operating load on the user is thereby reduced.

On the other hand, when the FAX number is input by the user (YES in S36) and the FAX device 10 is not in the specific state (NO in S38), the communication unit 40 executes the PSTN FAX sending process to the input FAX number as the destination (S54 and S56). Therefore, in the case where the FAX device 10 is in the state where only the PSTN FAX sending process can be executed, since the FAX device 10 executes the PSTN FAX sending process without executing the IP FAX sending process, execution of wasteful FAX sending processes can be prevented. As a result, FAX transmission can be promptly executed. As described above, the FAX device 10 according to the present embodiment is capable of executing whichever process is appropriate between the IP FAX sending process and the PSTN FAX sending process in both the case where the FAX device 10 itself is in the specific state and the case where the FAX device 10 itself is not in the specific state. In other words, the FAX device 10 according to the present embodiment is capable of executing appropriate communication depending on a state of the FAX device 10 itself. In addition, as described above, in the present embodiment, when the user enters a contract with the second-type provider, the FAX device 10 is judged not to be in the specific state, In this case, when the FAX number is input by the user, the communication unit 40 executes the PSTN FAX sending process (S54 and S56). Assuming that, when the FAX device 10 is not in the specific state, the communication unit 40 may generate an SIPURI including the input FAX number and may execute the IP FAX sending process, thereby a wrong FAX transmission to a destination not intended by the user may occur. In the present embodiment, when the FAX device 10 is not in the specific state, the communication unit 40 does not generate the SIPURI including the input FAX number and does not execute the IP FAX sending process even if the IP FAX sending process is capable of being executed. The wrong FAX transmission can be prevented.

A correspondence relationship between the configuration of the embodiment above and a configuration of the present invention will now be described. The Internet 8 and the FAX device 10 are, respectively, examples of an "IP network" and a "communication device". Processes of S54 and S56 in FIG. 3, and S44 to S56 in FIG. 3, are, respectively, examples of a "second communication process" and a "first communication process". The FAX number "xxxyyyzzzz" and the SIPURI "xxxyyyzzzz@sipuri.com" shown in FIG. 1 are, respectively, examples of "specific identification information" and "specific IP identification information". A case where a FAX sending operation is executed in S30 in FIG. 3 after a judgment of YES is made in S14 in FIG. 2 is an example of a "first case". In addition, a case where a FAX sending operation is executed in S30 in FIG. 3 after a judgment of NO is made in S4, S10, S12, or S14 in FIG. 2 is an example of a "second case". The DHCP server 70 is an example of a "server". An enterprise-number is an example of "specific information". Furthermore, an enterprise-number included in the enterprise-number table 35 is an example of "at least one provider information". A case of NO in S46 in FIG. 3 is an example of "in a case where the IP communication by using the specific IP identification information fails". A case of YES in S36 in FIG. 3 ("FAX" mode) and a case of YES in S60 in FIG. 4 ("IP FAX" mode) are, respectively, examples of a "first operating mode" and a "second operating mode".

B. Modifications

Modifications of the above embodiment will be listed below.

(1) The judgment of whether or not the FAX device 10 is in the specific state is not limited to the method of making the judgment based on the enterprise-number included in the DHCP information acquired from the DHCP server 70 as shown in FIG. 2, and an arbitrary method can be adopted. Therefore, for example, the user may input state information indicating whether or not the FAX device 10 is in the specific state directly into the memory 32 in advance. In this case, in the boot process, the judging unit 44 may judge whether or not the FAX device 10 is in the specific state according to the state information input by the user. This modification is also included in configurations of "judging whether or not the communication device itself is in a specific state".

(2) An "AUTO" mode can be arranged so as to be additionally settable as an operating mode of the FAX device 10. In the present modification, the communication unit 40 may be configured to execute the respective processes of S38 to S56 in FIG. 3 when the "AUTO" mode has been set. Moreover, in the present modification, the communication unit 40 may be configured to execute the PSTN FAX sending process to the FAX number acquired in S34 in FIG. 3 as the destination without executing the respective processes of S38 to S52 in FIG. 3 when the "FAX" mode has been set.

(3) In the above embodiment, when executing the IP FAX sending process, after the communication session is established between the FAX device 10 and the FAX device 110, the communication unit 40 sends FAX data to the FAX device 110 without having the SIP server 60 transfer the FAX data (refer to S52 in FIGS. 3 and S72 in FIG. 4). Instead, the communication unit 40 may be configured to send FAX data to the FAX device 110 via the SIP server 60 after the communication session is established between the FAX device 10 and the FAX device 110.

(4) In the above embodiment, while the FAX device 10 connected to both the PSTN 4 and the Internet 8 is an example of a "communication device", for example, the "communication device" may be a telephone apparatus or the like that is connected to both the PSTN 4 and the Internet 8. In this case, voice data communication using the PSTN 4 is an example of a "second communication process" and voice data communication using the Internet 8 is an example of a "first communication process".

(5) In the above embodiment, an example has been described in which, when the FAX device 10 is judged not to be in the specific state, the IP address and the SIP domain name (sipuri.com) of the SIP server 60 and the IP address of the SMTP server 80 are manually acquired and stored in the memory 32 by the user. However, the acquisition and storage in the memory 32 of the IP address and the SIP domain name of the SIP server 60 and the IP address of the SMTP server 80 may be automatically performed by an arbitrary method. Therefore, for example, the IP address and the SIP domain name of the SIP server 60 and the IP address of the SMTP server 80 may be stored in advance in the DHCP server 70. In this case, for example, the information may be arranged to be acquired by the judging unit 44 at the same time the judging unit 44 acquires DI-ICP information in S8 in FIG. 2 to be stored in the memory 32.

(6) A judgment need not be made on whether or not the information of the option 120 is included in the DHCP information that is acquired by the judging unit 44 in S8 in FIG. 2. In other words, the process of S10 in FIG. 2 may be omitted. In this case, after acquiring the DHCP information (S8), the judging unit 44 may execute the judgments of S 12 and 514 without executing the judgment of S10. In the present modification, after a judgment of YES is made in S14 and the fact that the FAX device 10 is in the specific state is stored, the judging unit 44 need only store the information on the option 120 included in the DHCP information acquired in S8 as the IP address of the SIP server 60 in the memory 32. When the information on the option 120 is not included in the DHCP information, the judging unit 44 does not store the IP address of the SIP server 60 in the memory 32.

(7) In the foregoing embodiment, respective units 40 to 46 are realized as a result of the control unit 24 performing the processes according to the program 34. Nevertheless, at least one unit of respective units 40 to 46 may alternately be realized by a hardware resource such as a logic circuit.

What is claimed is:

1. A communication device configured to be connected with both a public switched telephone network and an IP network, the communication device comprising:

a memory configured to store at least one provider information and a predetermined domain name, the at least one provider information indicating at least one provider that is capable of providing the communication device with a state that is capable of executing a first communication process, the predetermined domain name indicating the at least one provider; and a processor configured to cause the communication device to perform:

acquiring, from a server connected with the communication device, provider related information being related to a provider that a user enters into a contract with;

judging that the communication device itself is in a specific state that is capable of executing the first communication process of communicating via the IP network using IP identification information for the IP network, in a case where the acquired provider related information is identical with any one of the at least one provider information stored in the memory, the IP identification information including identification information for the public switched telephone network;

judging that the communication device itself is not in the specific state, in a case where the acquired provider related information is not identical with any one of the at least one provider information stored in the memory;

allowing the user to select an operating mode of the communication device, allowing the user to input first identification information for the public switched telephone network;

generating first IP identification information including the first identification information and the predetermined domain name by combining the first identification information input by the user and the domain name;

executing the first communication process using the generated first IP identification information, in a first case where the communication device itself is judged as being in the specific state, the first identification information is input by the user, and a first operating mode for communication via the public switched telephone network is selected;

executing a second communication process of communicating via the public switched telephone network using the first identification information, in a second case where the communication device itself is judged as not being in the specific state, the first identification information is input by the user, and the first operating mode is selected;

allowing the user to input second identification information for the public switched telephone network, the second identification information being different from the first identification information;

generating second IP identification information including the second identification information and the predetermined domain name by combining the second identification information input by the user and the predetermined domain name;

executing the first communication process using the generated second IP identification information, in a third case where the communication device itself is judged as being in the specific state, the second identification information is input by the user, and the first operating mode is selected;

executing the second communication process using the second identification information, in a fourth case where the communication device itself is judged as not being in the specific state, the second identification information is input by the user, and the first operating mode is selected;

allowing the user to input third IP identification information for the IP network; and executing the first communication process using the third IP identification information, in a case where a second operating mode for communicating via the IP network is selected, and the third IP identification information is input by the user.

2. The communication device as in claim 1, wherein the processor further causes the communication device to perform:

executing the judgment whether or not the communication device itself is in the specific state when the communication device is booted, confirming a result of the judgment, in a case where the first identification information is input by the user:

executing the first communication process using the first IP identification information, in the first case and in a case where the result of the judgment indicating that the communication device itself is in the specific state is confirmed;

executing the second communication process using the first identification information, in the second case and in a case where the result of the judgment indicating that the communication device itself is not in the specific state is confirmed;

confirming the result of the judgment, in a case where the second identification information is input by the user;

executing the first communication process using the second IP identification information, in the third case and in the case where the result of the judgment indicating that the communication device is in the specific state is confirmed; and executing the second communication process using the second identification information, in the fourth case and in the case where the result of the judgment indicating that the communication device itself is not in the specific state is confirmed.

3. The communication device as in claim 1, wherein the processor further causes the communication device to perform:

executing the second communication process using the first identification information, in the first case and in a case where the first communication process using the first IP identification information fails; and executing the second communication process using the second identification information, in the third case and in a case where the first communication process using the second IP identification information fails.

4. A non-transitory computer readable medium storing a computer program for a communication device configured to be connected with both a public switched telephone network and an IP network, the computer program including instructions for ordering a computer mounted on the communication device to execute:

acquiring, from a server connected with the communication device, provider related information being related to a provider that a user enters into a contract with;

judging that the communication device itself is in a specific state that is capable of executing the first communication process of communicating via the IP network using IP identification information for the IP network, in a case where the acquired provider related information is identical with any one of the at least one provider information stored in the memory, the IP identification information including identification information for the public switched telephone network;

judging that the communication device itself is not in the specific state, in a case where the acquired provider related information is not identical with any one of the at least one provider information stored in the memory;

allowing the user to select an operating mode of the communication device, allowing the user to input first identification information for the public switched telephone network;

generating first IP identification information including the first identification information and the predetermined domain name by combining the first identification information input by the user and the predetermined domain name:

executing the first communication process using the generated first IP identification information in a first case where the communication device itself is judged as being in the specific state, the first identification information is input by the user, and a first operating mode for communication via the public switched telephone network is selected;

executing a second communication process of communicating via the public switched telephone network using the first identification information, in a second case where the communication device itself is judged as not being in the specific state, the first identification information is input by the user, and the first operating mode is selected;

allowing the user to input second identification information for the public switched telephone network, the second identification information being different from the first identification information;

generating second IP identification information including the second identification information and the predetermined domain name by combining the second identification information input by the user and the predetermined domain name;

executing the first communication process using the generated second IP identification information, in a third case where the communication device itself is judged as being in the specific state, the second identification information is input by the user, and the first operating mode is selected;

executing the second communication process using the second identification information, in a fourth case where the communication device itself is judged as not being in the specific state, the second identification information is input by the user, and the first operating mode is selected;

allowing the user to input third IP identification information for the IP network; and executing the first communication process using the third IP identification information, in a case where a second operating mode for communicating via the IP network is selected, and the third IP identification information is input by the user.

5. A communication device configured to be connected with both a public switched telephone network and an IP network, the communication device comprising:

a memory configured to store a first provider and an SIP domain name indicating the first provider, the first provider being capable of providing the communication device with a state that is capable of executing an IP communicating process of communication via the IP network; and a processor configured to cause the communication device to perform:

acquiring, from a first server connected with the communication device, second provider information indicating a second provider registered in the first server and an IP address of a second server provided by the second provider;

allowing the user to select an operating mode of the communication device, allowing the user to input a first PSTN FAX number for the public switched telephone network;

generating a first SIPURI including the first PSTN FAX number and the SIP domain name by combining the first PSTN FAX number input by the user and the SIP domain name stored in the memory;

executing the IP communicating process with the generated first SIPURI as a destination by using the IP address of the second server in a first case where the second provider information is acquired, the acquired second provider information is identical with the first provider information, the first PSTN FAX number is input by the user, and a FAX operation mode is selected;

executing a public communication process of communication via the public switched telephone network with the first PSTN FAX number as a destination in a second case where the second provider information is not acquired or the acquired second provider information is not identical with the first provider information, the first PSTN FAX number is input by the user, and the FAX operation mode is selected;

allowing the user to input a second PSTN FAX number for the public switched telephone network, the second PSTN FAX number being different from the first PSTN FAX number;

generating a second SIPURI including the second PSTN FAX number and the SIP domain name by combining the second PSTN FAX number input by the user and the SIP domain name stored in the memory;

executing the IP communicating process with the generated second SIPURI as a destination by using the IP address of the second server in a third case where the second provider information is acquired, the acquired second provider information is identical with the first provider information, the second PSTN FAX number is input by the user, and the FAX operating mode is selected;

executing the public communicating process with the second PSTN FAX number as a destination in a fourth case where the second provider information is not acquired or the acquired second provider information is not identical with the first provider information, the second public identification information is input by the user, and the FAX operating mode is selected;

allowing the user to input an email address for the IP network; and executing the IP communicating process using the email address in a case where an IFAX operating mode for communicating via the IP network is selected, and the email address is input by the user.

* * * * *